(12) United States Patent
Chen

(10) Patent No.: US 8,695,471 B2
(45) Date of Patent: Apr. 15, 2014

(54) SCROLL SAW HAVING A SLIDING PLATE FOR IMPROVED BLADE CHANGING

(75) Inventor: Jung-Huo Chen, Taichung (TW)

(73) Assignee: Rexon Industrial Corp., Ltd., Taichung (TW)

( * ) Notice: Subject to any disclaimer, the term of this patent is extended or adjusted under 35 U.S.C. 154(b) by 358 days.

(21) Appl. No.: 13/070,869

(22) Filed: Mar. 24, 2011

(65) Prior Publication Data

US 2011/0232452 A1 Sep. 29, 2011

(30) Foreign Application Priority Data

Mar. 25, 2010 (TW) .............................. 99108980 A

(51) Int. Cl.
*B27B 19/02* (2006.01)

(52) U.S. Cl.
USPC .............................................. 83/781; 83/783

(58) Field of Classification Search
USPC ........... 83/781, 783, 784, 785, 786, 820, 788, 83/792; 108/90, 91, 97, 98, 83, 180, 108/158.12, 158.13
See application file for complete search history.

(56) References Cited

U.S. PATENT DOCUMENTS

| | | | | |
|---|---|---|---|---|
| 199,845 | A * | 1/1878 | McChesney | 83/785 |
| 4,658,687 | A * | 4/1987 | Haas et al. | 83/438 |
| 6,076,445 | A * | 6/2000 | Kenyon et al. | 83/477.2 |
| 6,267,038 | B1 | 7/2001 | O'Banion et al. | |
| 6,318,276 | B1 * | 11/2001 | Reinecke | 108/159.11 |
| 8,069,765 | B2 * | 12/2011 | McIntosh et al. | 83/788 |
| 2002/0040530 | A1 * | 4/2002 | Crawley | 30/380 |

* cited by examiner

*Primary Examiner* — Stephen Choi
(74) *Attorney, Agent, or Firm* — Bacon & Thomas, PLLC

(57) ABSTRACT

A scroll saw includes a base, a worktable mounted to the base, a sliding plate slidably mounted on the worktable and a cutting assembly mounted to the base. A cutting slot is defined between the worktable and the sliding plate for a saw blade of the cutting assembly to pass therethrough. When the sliding plate is moved relative to the worktable to an appropriate position or is removed from the worktable, the saw blade can be changed easily and conveniently.

7 Claims, 6 Drawing Sheets form the cutting slot. Further, a locking mechanism is provided for locking the sliding plate to the worktable.

Subject to the aforesaid design, a user can move the sliding plate relative to the worktable into a proper position for cutting or can remove the sliding plate from the worktable. When the sliding plate is removed from the worktable, a sufficient space is left to allow for changing or replacing the saw blade. Further, when the sliding plate is repositioned back in the worktable, the gap of the cutting slot between the inner end of the sliding plate and the worktable is minimized, thus preventing a small workpiece from falling from the worktable through the cutting slot or from jamming in the cutting slot.

SCROLL SAW HAVING A SLIDING PLATE FOR IMPROVED BLADE CHANGING

This application claims, under 35 U.S.C §119, priority to Taiwanese Application No. 099108980, filed Mar. 25, 2919, which application is hereby incorporated by reference in its entirety, inclusive of the specification, claims, and drawings.

FIELD OF THE INVENTION

The present disclosure relates to saw machine technology and more particularly, to a scroll saw having a sliding plate for improved blade changing or replacement.

BACKGROUND

Referring to FIG. 1, a conventional scroll saw 10 is known and includes a base 12, a worktable 14 pivotally mounted to the base 12, and a cutting assembly 16 mounted to the base 12. When a workpiece is placed on the worktable 14, the saw blade 162 of the cutting assembly 16 can be operated to cut a predetermined cut line on the workpiece, or to cut a bevel face on the workpiece, subject to rotation of the worktable 14 relative to the base 12.

Further, in order to facilitate changing of the saw blade 162 and to avoid interference of the rotated worktable 14 with the cutting operation of the saw blade 162, the scroll saw 10 may be equipped with a circular cover plate 18 on the worktable 14. The circular cover plate 18 has a T-shaped clearance slot 182 for movement of the saw blade 162 therein. However, when the saw blade 162 is to be changed or replaced, the circular cover plate 18 must first be detached from the worktable 14. After the saw blade 162 is changed or replaced, the circular cover plate 18 must be repositioned and refastened to the worktable 14. Thus, the saw blade replacement procedure is complicated and time consuming. Further, two facilitate inserting the saw blade 162 through the T-shaped slot 182, the T-shaped slot 182 must have a certain width, normally about 4-5 times greater than the width of the saw blade 162. Thus, due to the large width of the T-shaped slot 182, there is a strong likelihood that a small workpiece may fall from the worktable 14 through the T-shaped slot 182 or become jammed within the T-shaped slot 182. Further, the blade changing or replacement operation is inconvenient.

SUMMARY

The present disclosure has been accomplished under the circumstances in view. Therefore, a scroll saw is provided according to the present disclosure, which scroll saw facilitates blade changing performance.

Another advantage of the scroll saw according to the present disclosure is that the scroll saw prevents a small workpiece from falling from the worktable through the cutting slot, or from jamming in the cutting slot.

To achieve these and other objects, a scroll saw according to the present disclosure includes a base, a worktable, a sliding plate, and a cutting assembly. The worktable is pivotally mounted to the base, and also provides a sliding track. The sliding plate is slidably mounted on the sliding track and movable relative to the worktable so that a cutting slot can be defined between the worktable and the sliding plate. The cutting assembly is mounted to the base, and includes a saw blade that is inserted through the cutting slot.

In one embodiment of the present disclosure, the sliding plate has a notched inner end abutted against the worktable to

BRIEF DESCRIPTION OF THE DRAWINGS

Other features and advantages of the present disclosure will be understood by reference to the following specification in conjunction with the accompanying drawings, which like reference signs denote like elements of the structure.

DETAILED DESCRIPTION

Figure 1:
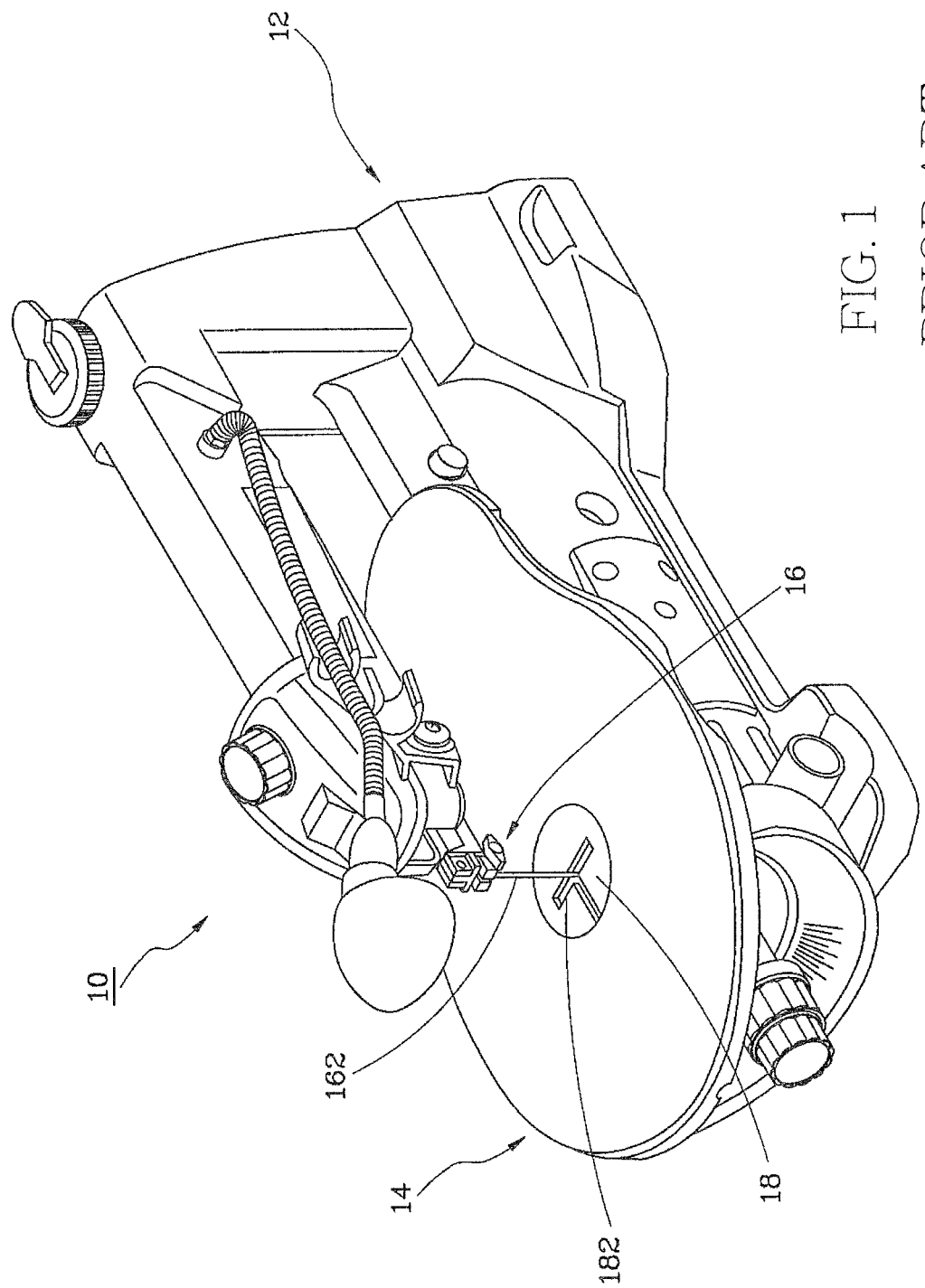
FIG. 1 is an oblique elevation view of a scroll saw according to the prior art.
Figure 2:
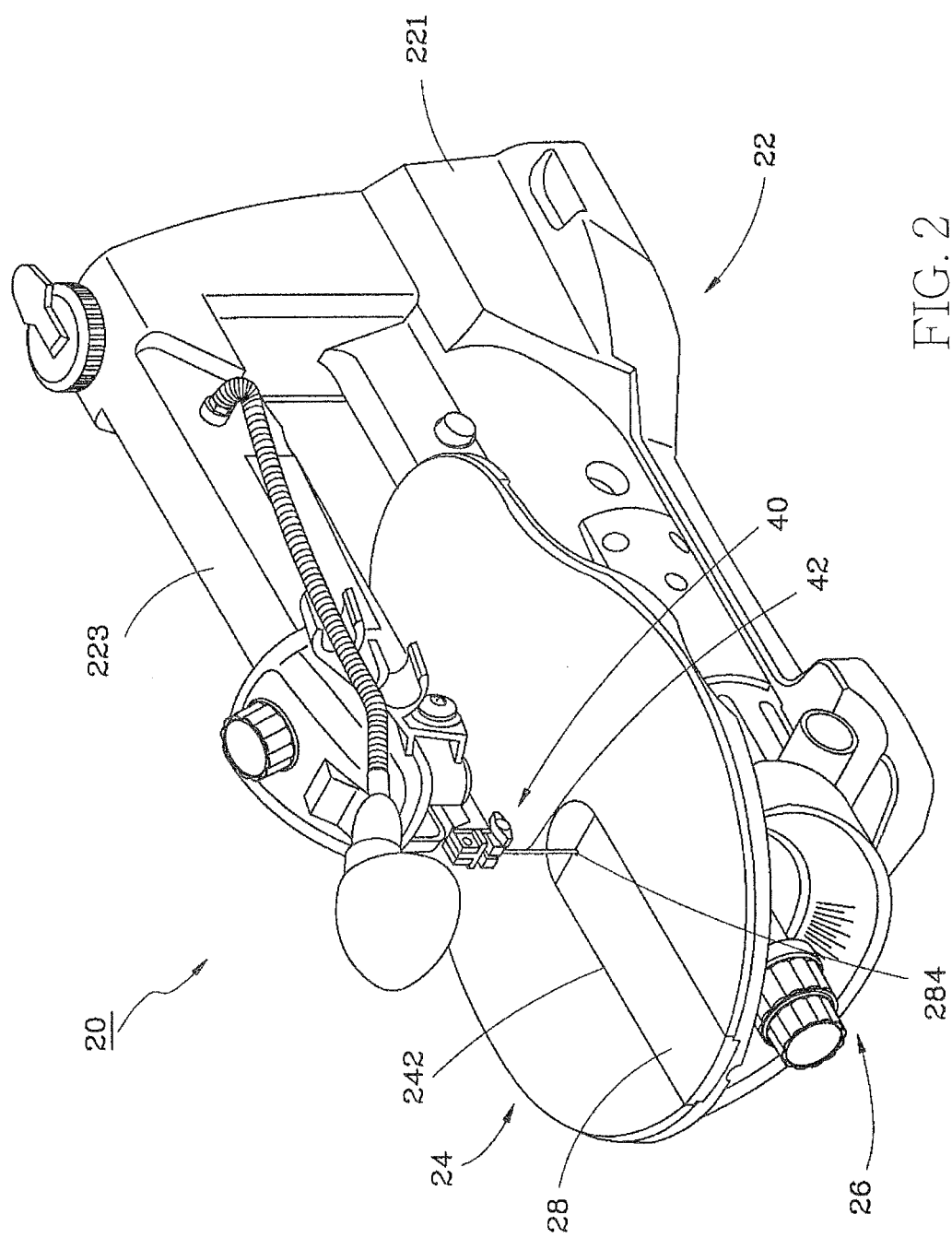
FIG. 2 is an oblique elevation view of a scroll saw in accordance with a first embodiment of the present disclosure.
Figure 5:
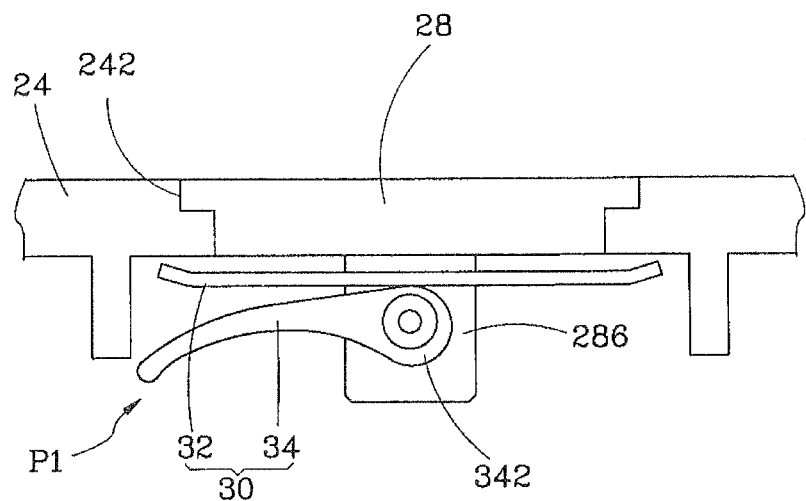
FIG. 5 is a schematic end view of the scroll saw in accordance with the present disclosure, illustrating a locking lever of a locking mechanism in a first unlocked position.

Referring to FIGS. 2 and 5, a scroll saw 20 in accordance with a first embodiment of the present disclosure is shown. The scroll saw 20 includes a base 22, a worktable 24, a pivoting mechanism 26, a sliding plate 28, a locking mechanism 30, and a cutting assembly 40.

The base 22 includes a bottom portion 221 and a cantilever arm portion 223 disposed at the top side of the bottom portion 221.

Figure 3:
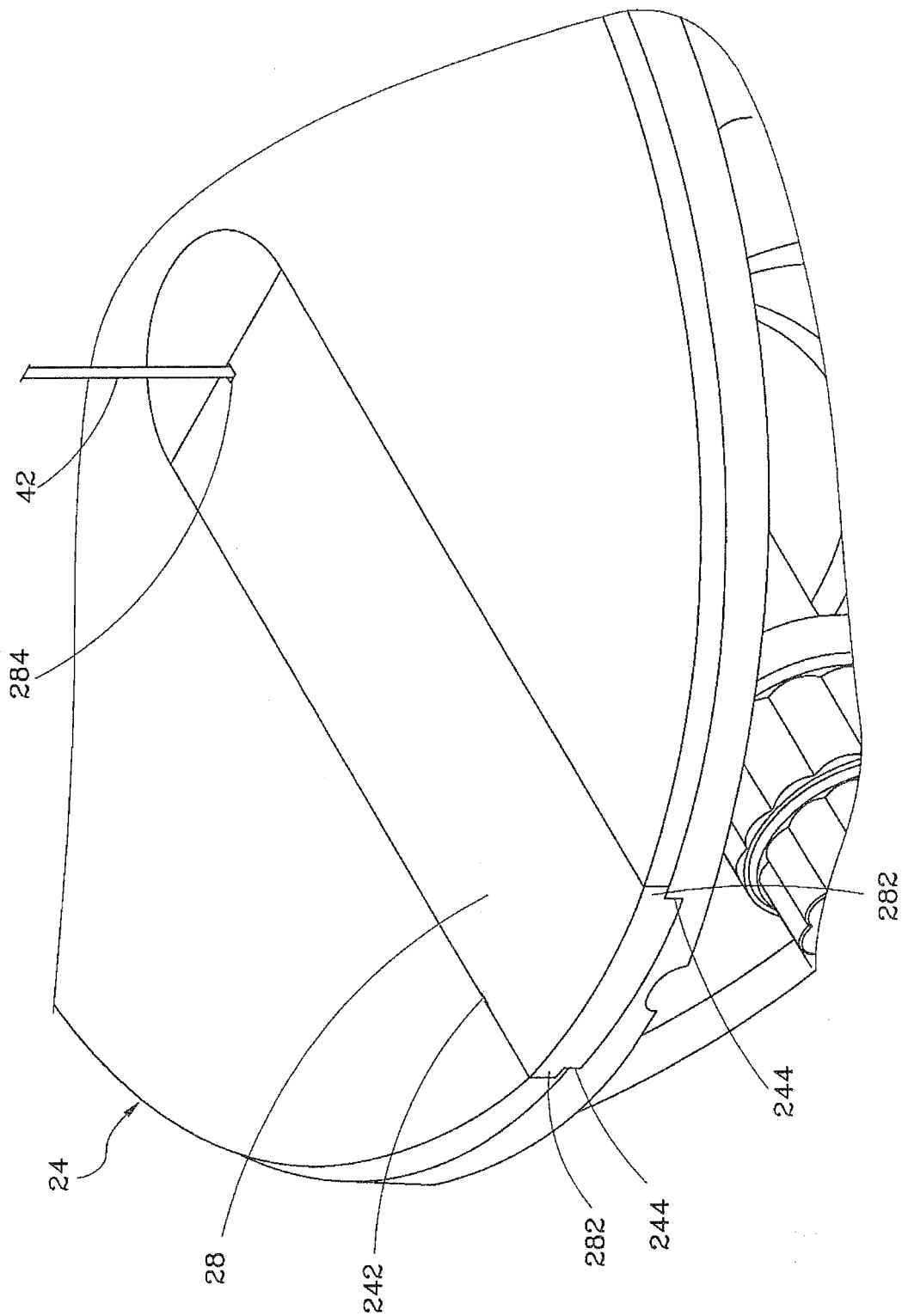
FIG. 3 is an enlarged partial view of the scroll saw in accordance with the first embodiment of the present disclosure.
Figure 4:
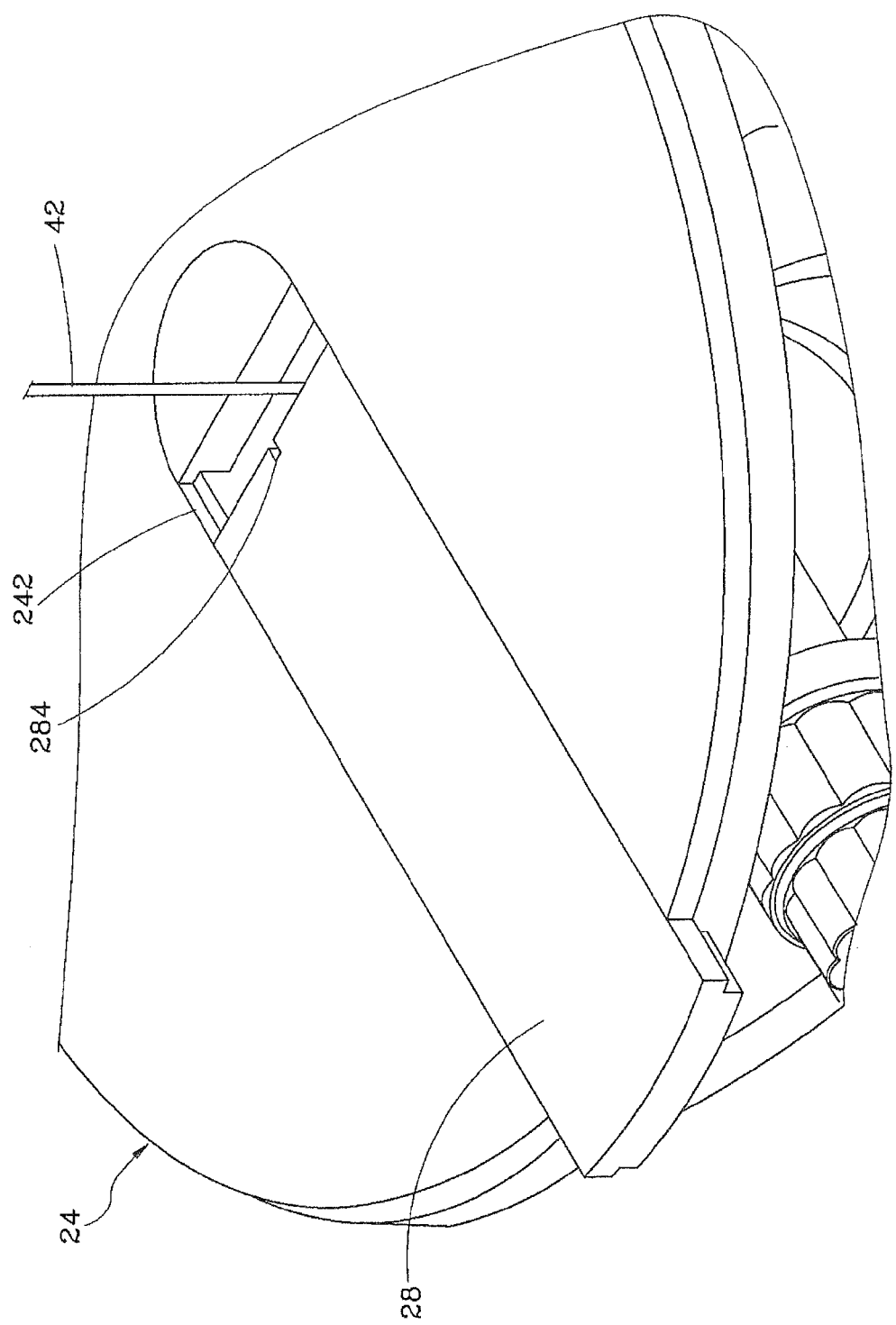
FIG. 4 is similar to FIG. 3, illustrating the sliding plate moved relative to the worktable.

Referring also to FIGS. 3 and 4, the worktable 24 for holding a workpiece is pivotally mounted on the bottom portion 221 of the base 22 and rotatable leftwards and rightwards relative to the base 22. The worktable 24 includes a sliding track 242 that extends radially from a central portion thereof to the border of the worktable 24. Further, the sliding track 242 defines two opposed steps 244 on opposed parallel sides of the sliding track 242.

The pivoting mechanism 26 is connected between the base 22 and the worktable 24, and adapted is for rotating the worktable 24 leftwards or rightwards relative to the base 22.

The sliding plate 28 is mounted in the sliding track 242 of the worktable 24 and is movable relative to the worktable 24. The sliding plate includes two shoulders 282 complementary shaped and respectively supported on the two opposed steps 244. According to this embodiment, the sliding plate 28 has a notched inner end abutted against the worktable 24 to form a cutting slot 284, and an outer end maintained flush with the periphery of the worktable 24.

Further, as best seen in FIG. 5, the sliding plate 28 has a protruding portion 286 extending downwardly from the bottom wall thereof.

Figure 6:
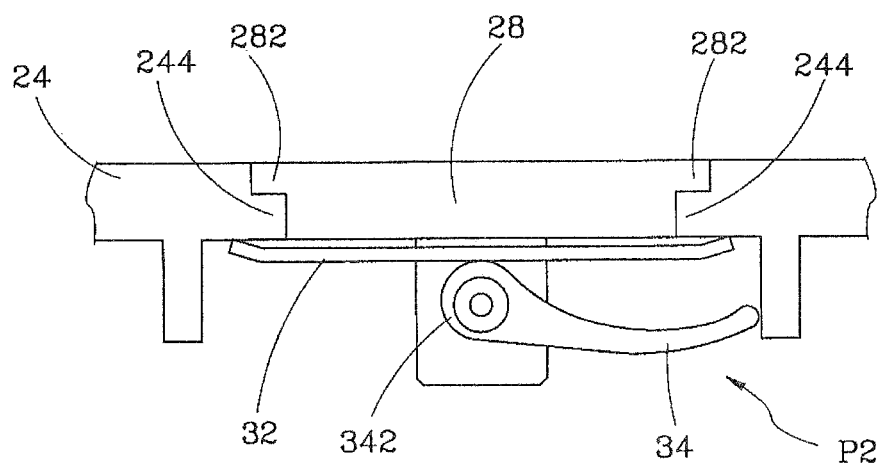
FIG. 6 is similar to FIG. 5, illustrating the locking lever in a second locked position.

Referring to FIGS. 5 and 6, the locking mechanism 30 includes a locking plate 32 and a locking lever 34. The locking plate 32 is mounted on the protruding portion 286 of the sliding plate 28 and is movable with the sliding plate 28. The locking lever 34 has a cam 342 located on a first end and pivotally connected to the protruding portion 286 of the sliding plate 28. Thus, the locking lever 34 can be moved relative to the sliding plate 28 between a first unlocked position P1 and a second locked position P2.

When the locking lever 34 is in the first unlocked position P1, as shown in FIG. 5, the cam 342 does not engage the locking plate 32, and the sliding plate 28 can be moved along the sliding track 242 relative to the worktable 24, as shown in FIG. 4.

When the locking lever 34 is in the second locked position P2, as shown in FIG. 6, the cam 342 engages the locking plate 32 and biases the locking plate 32 against the worktable 24, forcing the shoulders 282 of the sliding plate 28 against the steps 244 of the sliding track 242, and therefore the sliding plate 28 is locked in position and cannot be moved relative to the worktable 24.

The cutting assembly 40 is installed in the cantilever arm portion 223 of the base 22, and includes a saw blade 42 for cutting a workpiece that extends through the cutting slot 284.

As stated above, in order to change or replace the saw blade 42, the locking lever 34 is rotated to the first unlocked position P1 shown in FIG. 5 to enable the sliding plate 28 to be moved along the sliding track 242 of the worktable 24 to a proper position with the notched inner end spaced from the worktable 24, as shown in FIG. 4, or to be completely removed from the worktable 24. At this time, sufficient space is provided to allow a user to change the saw blade 42. After saw blade replacement, the sliding plate 28 is replaced and/or moved along the sliding track 242 of the worktable 24 until that the notched inner end of the sliding plate 28 is abutted against the worktable 24 and the saw blade 42 is received in the cutting slot 284. At this time, the user can rotate the locking lever 34 to the second locked position P2 shown in FIG. 6 in order to lock the sliding plate 28 in position on the worktable 24.

With the above-described configuration, the size of the cutting slot 284 of the scroll saw 20 is minimized, and is appropriately sized in order to just allow the saw blade 42 to pass therethrough. Thus, even a small workpiece cannot pass through the cutting slot 284 during cutting. Therefore, the scroll saw according to the present disclosure effectively prevents a small workpiece from falling from the worktable through the cutting slot 284, or from jamming in the cutting slot 284.

Figure 7:
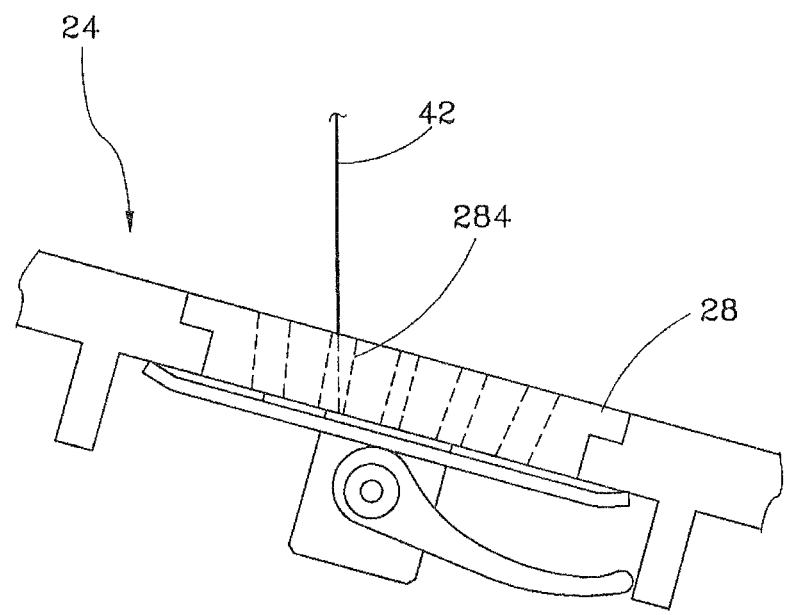
FIG. 7 is a schematic end view of a scroll saw in accordance with a second embodiment of the present disclosure.

Further, in order to accommodate pivoting of the worktable 24 relative to the base 22, the sliding plate 28 can be provided with differently tilted cutting slots 284 at its inner end, as shown in FIG. 7. Thus, when the sliding plate 28 is pivoted with the worktable 24 relative to the base 22 to a particular angle, the saw blade 42 can pass through an appropriate one of cutting slots 284 to avoid interference between the saw blade 42 and the sliding plate 28.

Figure 8:
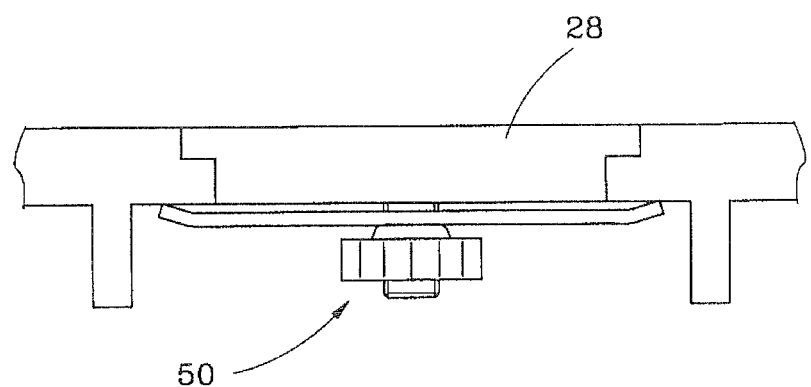
FIG. 8 is a schematic end view of a scroll saw in accordance with a third embodiment of the present disclosure.

It is to be understood that the sliding plate locking method is not limited to the use of the aforesaid locking mechanism 30. Ball lock means, spring lock means, or a lock screw 50, as show in FIG. 8, can be used in place of the aforesaid locking mechanism 30 for locking the sliding plate 28 in position. Further, the complementary matching arrangement between the sliding plate and the worktable is not limited to the aforesaid shoulder and step matching design, and other tongue and groove designs can be used as substitutes to achieve directional positioning between the sliding plate and the worktable without any extra positioning means.

Although particular embodiments of the disclosure have been described in detail for purposes of illustration, various modifications and enhancements may be made without departing from the spirit and scope of the disclosure. Accordingly, the disclosure is not to be limited except as by the appended claims.

What is claimed is:

1. A scroll saw, comprising:
   a base;
   a worktable mounted on said base and having a sliding track;
   a sliding plate slidably mounted in said sliding track and defining at least one cutting slot between said sliding plate and said worktable;
   a cutting assembly mounted on said base including a saw blade inserted through said at least one said cutting slot; and
   a locking mechanism adapted for locking said sliding plate to said worktable, the locking mechanism including a locking plate mounted to the sliding plate and movable with the sliding plate, such that the locking plate is configured to disengage one side of the worktable when in a first unlocked position and engage the worktable when in a second locked position;
   wherein the locking plate is configured to move between the first unlocked position where the sliding plate is movable along the sliding track, and the second locked position where the locking plate is biased against the worktable and the sliding plate is not movable relative to the worktable.

2. The scroll saw according to claim 1, wherein said worktable comprises two opposed steps bilaterally disposed in said sliding track; and said sliding plate comprises two shoulders respectively supported on said steps.

3. The scroll saw according to claim 2, wherein said sliding plate further comprises a protruding portion extending from one side thereof; said locking mechanism comprising the locking plate mounted on said protruding portion and a locking lever pivotally connected to said protruding portion.

4. The scroll saw according to claim 3, wherein said locking lever comprises a cam located on a first end thereof and pivotally connected to said protruding portion of said sliding plate, said cam movable with said locking lever to selectively bias said sliding plate against said worktable and to further force said shoulders of said sliding plate against said steps of said worktable.

5. The scroll saw according to claim 2, wherein said locking mechanism further comprises a locking screw, said locking screw selectively rotatable to bias said sliding plate against said worktable and to further force said shoulders of said sliding plate against said steps of said worktable.

6. The scroll saw according to claim 1, wherein said sliding plate comprises an inner end configured to be abutted against said worktable and at least one end notch located on said inner end and cooperating with said worktable to define said at least one cutting slot.

7. The scroll saw according to claim 1, wherein said sliding plate comprises a plurality of end notches located on an inner end to define with said worktable multiple cutting slots for enabling said saw blade to selectively pass through one of the plurality of cutting slots subject to rotation of said worktable relative to said base.

* * * * *